A. T. BROWN.
TRANSMISSION GEARING.
APPLICATION FILED JUNE 5, 1915.

1,259,829.

Patented Mar. 19, 1918.
5 SHEETS—SHEET 1.

WITNESS

INVENTOR.
Alexander T. Brown,
BY
ATTORNEYS.

A. T. BROWN.
TRANSMISSION GEARING.
APPLICATION FILED JUNE 5, 1915.

1,259,829.

Patented Mar. 19, 1918.
5 SHEETS—SHEET 2.

WITNESS

INVENTOR.
BY
ATTORNEYS.

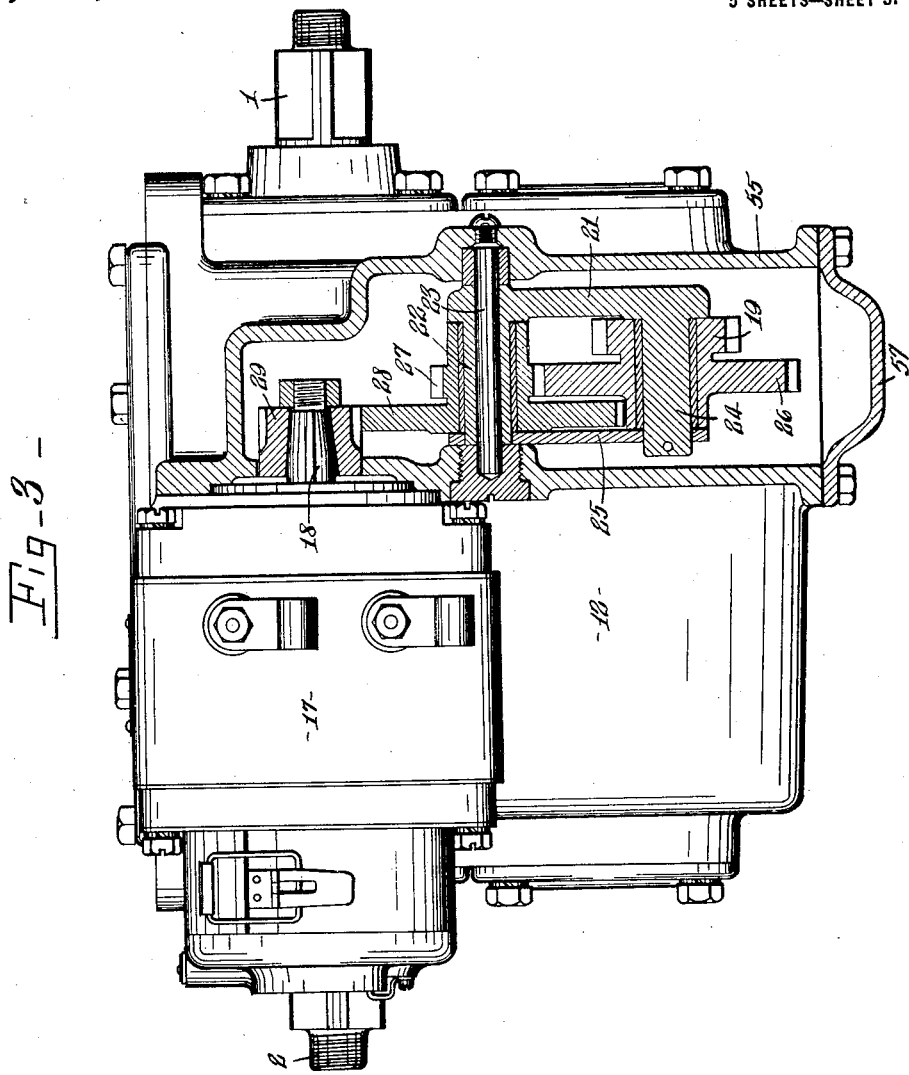

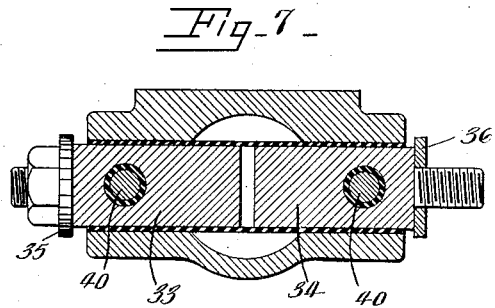
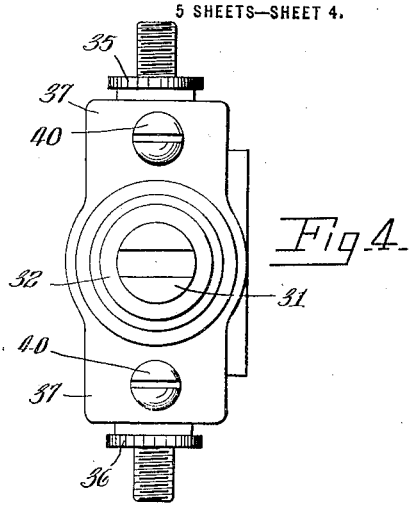
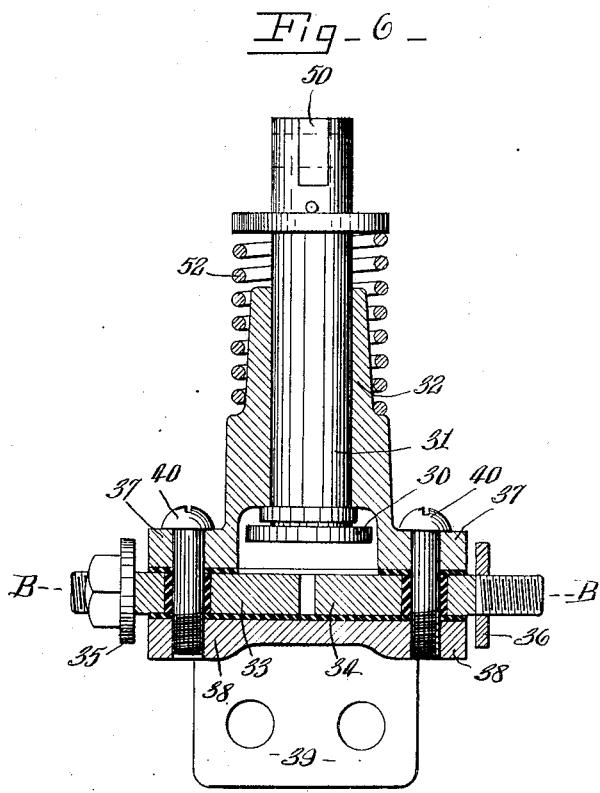
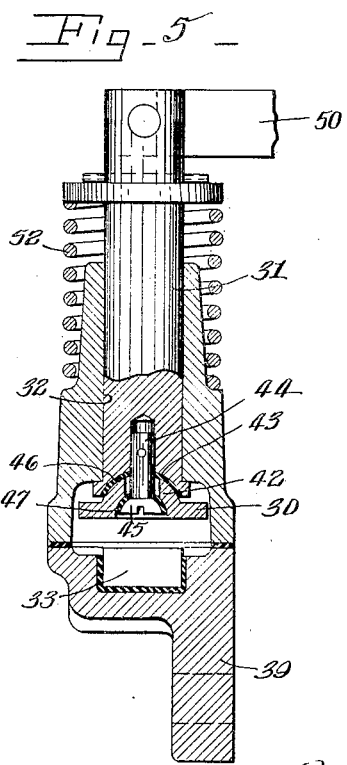

A. T. BROWN.
TRANSMISSION GEARING.
APPLICATION FILED JUNE 5, 1915.
1,259,829.
Patented Mar. 19, 1918.
5 SHEETS—SHEET 5.
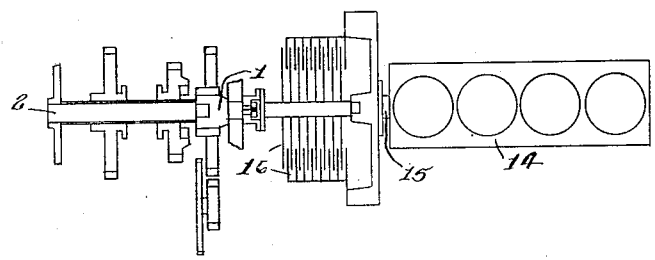
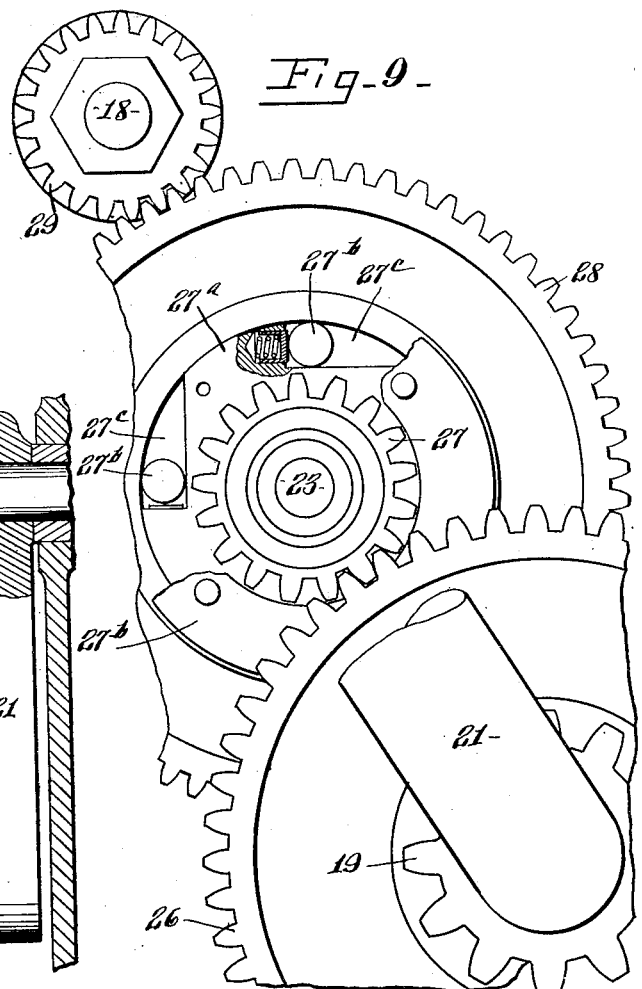
WITNESS
Chas H Young
INVENTOR.
Alexander T. Brown,
BY
Larson & Bodell
ATTORNEYS.

of Syracuse, in the county of Onondaga and
UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A CORPORATION OF NEW YORK.

TRANSMISSION-GEARING.

1,259,829.  Specification of Letters Patent.  Patented Mar. 19, 1918.

Application filed June 5, 1915. Serial No. 32,322.

*To all whom it may concern:*

Be it known that I, ALEXANDER T. BROWN, a citizen of the United States, and a resident of Syracuse, in the county of Onondaga and State of New York, have invented a certain new and useful Transmission-Gearing, of which the following is a specification.

This invention relates to change speed transmission gearing for motor vehicles, and has for its object means by which the starting of the internal combustion engine, which normally transmits its power through the gearing, is accomplished by a starting motor connectible to, and disconnectible from, the gearing; and the invention consists in the combinations and constructions hereinafter set forth and claimed.

In describing this invention, reference is had to the accompanying drawings, in which like characters designate corresponding parts in all the views.

Fig. 3 is a side elevation, partly in section, looking to the right in Fig. 1.

Fig. 4 is a plan view of the detached operating means for the switch and contiguous parts.

Figs. 5 and 6 are sectional views, partly in elevation, taken centrally on Fig. 4, at a right angle to each other.

Fig. 7 is a section on line B—B, Fig. 6.

Figs. 8 and 9 are enlarged fragmentary views of starting gears and contiguous parts similar to the starting gears and parts shown in Figs. 2 and 3, illustrating the roller clutch which prevents the transmission gearing, after being started, from transmitting motion back to the starting motor.

Fig. 10 is a diagrammatic view showing this gearing connected to an internal combustion engine, and the relative position of the starting gears.

Figure 1:
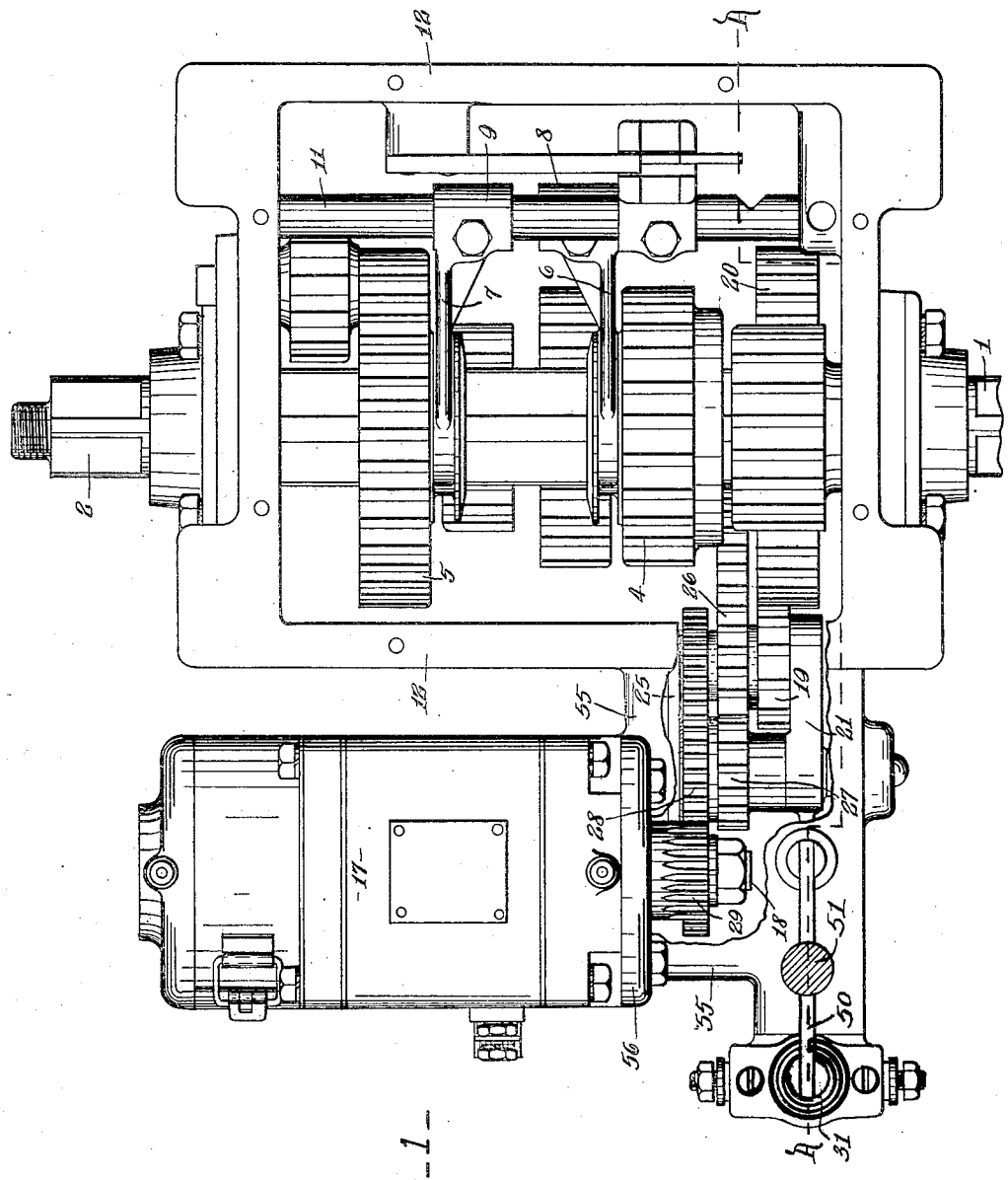
Figure 1 is a plan view of a transmission gearing provided with my invention, the top plate of the case being removed and a portion of said case being broken away.

This invention comprises, generally, a transmission gearing, a starting motor, and means for connecting and disconnecting the motor and the gearing.

The gearing here illustrated is a change speed gearing of the selective type and includes driving and driven shafts 1, 2 arranged in axial alinement, a countershaft 3, intermeshing gears on the shafts 1, 2 and on the countershaft 3, some of these gears, as 4, 5, being shiftable for the purpose of changing the speed of the driven shaft, and means for shifting said gears, as forks 6, 7, having hubs 8, 9 mounted on suitable guiderods 10, 11. The driving and driven shafts are connected respectively to the engine, Fig. 10, by means of a suitable clutch, and to a part to be driven, as the live axles or driving wheels of a motor vehicle. The forks are operated by any suitable mechanism in the ordinary manner.

The gears of the gearing are inclosed in a suitable case 12, and the lever or levers for operating the forks 6, 7 are mounted on suitable shafts which in turn are usually mounted upon the top plate 13 of the case, as will be understood by those skilled in the art. The gearing construction and operation form no part of this invention, and my starting motor and gearing may be applied to, or used in connection with, any type of transmission gearing.

14 designates the internal combustion engine, the shaft 15 of which is connected to the driving shaft 1 by means of a clutch 16 of any suitable construction, Fig. 10.

17 designates the starting motor which is connected in the electrical system of the motor vehicle. 18 is the rotary shaft of said motor.

The means for connecting and disconnecting the starting motor and the gearing includes a shiftable member normally out of active position, and shiftable into active position when the motor is connected in circuit with the electric system of the motor vehicle.

As here shown, said shiftable member is a gear 19 movable into and out of mesh with a gear associated with the transmission gearing, and this latter gear in this embodiment of my invention is one of the gears used in transmitting the power of the gearing in some operations of said gearing. As here shown, said gear 19 is movable into and out of mesh with the gear 20 mounted on the countershaft 3 in mesh with the gear on the driving shaft 1 of the gearing, and this shifting movement is preferably in a direction at a right angle to the axis of said gear 20 in contradistinction to being in an axial direction.

As here shown, the gear 19 is carried by a swinging frame lever 21 having a hub 22 mounted upon a stationary shaft 23, the frame lever 21 also having a stud 24 near its free end upon which the gear 19 is mounted.

As seen in Fig. 3, the hub 22 and the stud 24 are formed integral with one of the sides of the frame lever and the other side 25 of the frame lever is detachably mounted on said hub and stud.

Concentrically mounted with the gear 19 and preferably formed integral with the hub thereof, is a gear 26 which meshes with a pinion 27 mounted on the hub 22 of the frame lever, and upon the hub of the pinion is also mounted a gear 28 meshing with the gear 29 mounted on the end of the starting shaft 18. The gear 29 transmits the motion of the motor shaft 18 to the gear 28 which in turn transmits the motion through the pinion 27, and gear 26, to the gear 19, and when the gear 19 is in mesh with the gear 20, the gears of the gearing will be rotated from the motor shaft 18. The axes of the shafts 3, 23, 24 are so arranged that when the gear 19 is in mesh with the gear 20, straight lines passing through the axes of the shafts 3, 24 and 23, 24 meet at an obtuse angle, and hence with the gear 19 rotating in the direction of the arrow, Fig. 2, the gears 19, 20 will have a tendency to be held in mesh owing to the direction of rotation of the gears.

Figure 2:
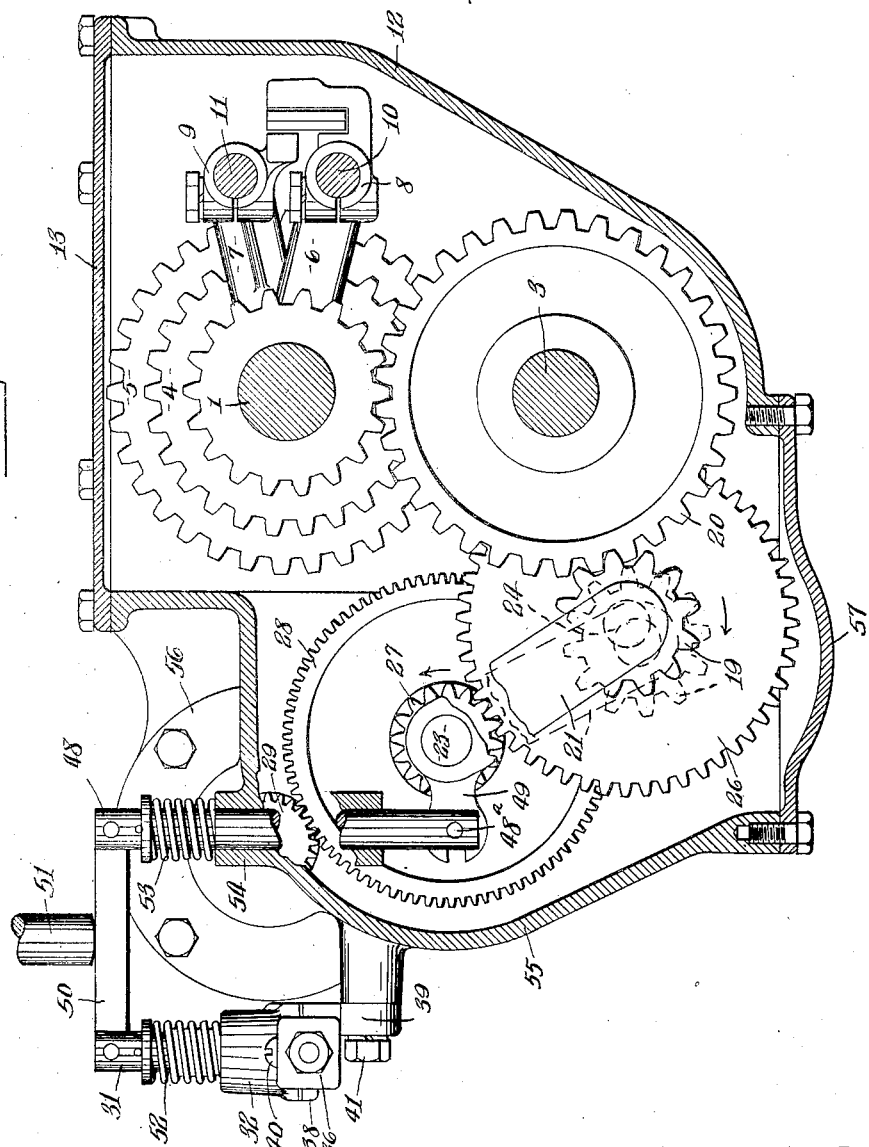
Fig. 2 is a sectional view, partly in elevation, taken on the plane of line A—A, Fig. 1.

The pinion 27 is driven from the motor in the direction of the arrow Fig. 2, and the actuation of the pinion tends to swing the frame lever 21 to the right Fig. 2, and to carry the gear 19 into mesh with the gear 20. As soon as the engine connected to the gearing is started, the gear 20 which is now being driven by the engine, forces or shifts the gear 19 out of mesh with the gear 20, owing to the arrangement of the axes 3, 23 and 24, the forcing or shifting of the gear 19 being facilitated by the pressure angles of the teeth of the gears 19, 20. Hence, the gearing is automatically disconnected from the motor.

In Figs. 8 and 9, the pinion 27 is shown as connected to the gear 28 by a roller clutch which transmits the driving motion of the gear 28 to the pinion 27, but which prevents the transmission of motion from the pinion 27 to the gear 28. This clutch includes a disk 27ᵃ here shown as formed integral with the pinion 27 and arranged within the gear 28, and rollers 27ᵇ located in notches 27ᶜ in said disk. Annular side plates 27ᵈ secured to the disk, hold the gear and clutch assembled.

The roller clutch or its equivalent is necessary or desirable only in connection with an engine of four cylinders or less, as oftentimes in starting such an engine, a charge will not ignite but after being compressed will expand and give a sudden impulse to the piston causing the engine to jump ahead. The sudden impulse or jump imparted to the crank shaft causes the gear 20 to momentarily rotate faster than the gear 19 moving the gear 19 partly or wholly out of mesh therewith, hence momentarily disconnecting or partially disconnecting the starting motor and the gearing. In the case of engines of more than four cylinders, as sixes, the roller clutch or similar device is unnecessary for obvious reasons. The roller clutch, or its equivalent, would however be desirable in connection with any type of engine if the starting gears were not arranged to be automatically disconnected from the transmission gearing after the transmission gearing is being driven by the engine.

30, Fig. 6, is a switch for connecting and disconnecting the motor in the electric system of the vehicle. Said switch may be of any suitable construction, it being here shown as carried at the lower end of a plunger 31 movable in a suitable guide 32. 33, 34 are the terminals of the motor switch, which terminals have binding devices 35, 36 at their ends by means of which the wires of the electric system can be connected to the motor.

The terminals 33, 34 are located below the switch 30, are spaced apart and are clamped between the base flange 37 of the plunger guide 32 and the flange 38, of the supporting bracket 39. The clamping of the flanges 37 and 38 is effected by screws 40 extending through the terminals 33, 34, and the screws and terminals being suitably insulated, as clearly seen in Fig. 6. The bracket 39 is suitably secured to the case, as by cap screws 41.

The switch 30 moves rectilinearly toward and from the terminals 33, 34, and in order that it may always be brought flatwise against the terminals, it is connected to the plunger 31 by a ball-and-socket or a universal joint. As seen in Fig. 5, the switch is formed with a concavo-convex, spherical portion 42 fitting in a complemental socket 43 in the end of the plunger 31 and is held in position by a pin 44 extending axially therethrough into the plunger, the pin loosely fitting a hole in the spherical portion of the switch and having a spherical head 45 fitting in a concave socket in the lower side of the switch. Insulation washers 46 and 47 are also inserted respectively between the portion 42 and the plunger and between the head of the pin and its socket in the switch.

The means for swinging the frame 21 on its axis, includes a plunger 48 movable parallel to the plunger 31, and connected at its lower end at 48ᵃ by a pin-and-slot joint to an arm 49 extending from the axis of the frame lever 21. The upper ends of the plungers 31 and 48 are connected by a crosshead 50 with which coacts an actuating part 51 by means of which both plungers can be operated in one operation. The actuating part 51 loosely rests upon the crosshead to permit the crosshead to rock relatively to said part 51.

Compression springs 52, 53 are interposed between shoulders on the plungers 31 and 48 and the guides 32 and 54 for said plungers respectively.

The case 12 of the transmission gearing is formed on one side thereof with a laterally extending portion 55 which incloses the train of gears between the starting motor and the gears of the gearing, said laterally extending portion 55 forming a hollow bracket having a face plate 56 to which the case of the motor 17 is bolted. The bracket 39, supporting the switch 30 and operating mechanism thereof and also the motor terminals, is also secured to the hollow bracket portion 55 of the case 12 by the cap screws 41. The under side or bottom of the hollow bracket and the contiguous portion of the main case 12 is provided with a removable plate 57.

In operation, the gear 19 is normally out of mesh with the gear 20 and the motor 17 is disconnected from the electrical system of the motor vehicle. When it is desired to start the engine of the vehicle, the operating member 51 is depressed, thereby causing the plunger 48 to force the gear 19 into contact with the gear 20 and the plunger 31 to carry the switch 30 to engage the terminals 33, 34, whereupon the gears of the transmission gearing will be actuated from the starting motor, and the engine will be turned over until it runs by its own power. If the gears 19, 20 do not mesh when they first contact, the action of the train of starting gears will carry the gear 19 into mesh with the gear 20.

It is not necessary to hold the plunger 48 depressed as the gear 19 is held in mesh with the gear 20 owing to the action of the gears 26, 27 and the swinging frame lever 21 as previously explained. In fact, this plunger could be dispensed with, as far as this operation is concerned. As soon as the pressure on part 51 is relieved, the springs 52 and 53 return the movable parts with which they coact to their starting positions. The train of gears 26, 27 and 28 constitute means for shifting the gear 19 into mesh with the gear 20 and for actuating said gear 19.

This transmission gearing is particularly advantageous in that the motor starting mechanism is a part thereof, and further in that if it is desired to run the vehicle from the storage battery, the engine can be disconnected from the transmission gearing so that no power is wasted in running the engine.

By the term "starting motor" in the claims, is meant any motor which is not used in the normal operation to drive the gearing.

What I claim is:—

1. The combination of a change speed transmission gearing, including a gear utilized to transmit motion in one of the gear changes of the gearing, a starting motor, and means for connecting and disconnecting the motor and said gear, substantially as and for the purpose described.

2. The combination of an internal combustion engine, a change speed transmission gearing, including a gear utilized to transmit motion in one of the gear changes of the gearing, means connecting the gearing and the engine, a starting motor, and means for connecting and disconnecting the starting motor and said gear, substantially as and for the purpose specified.

3. The combination of a change speed transmission gearing, an electric starting motor, a switch for connecting and disconnecting the motor into and out of an electric circuit, power transmitting means between the motor and the gearing including a member shiftable into and out of connection with the gearing, and means for operating the switch and shifting said member, substantially as and for the purpose set forth.

4. The combination of a change speed transmission gearing, including a gear utilized to transmit motion in one of the gear changes of the gearing, an electric motor, a switch for connecting the motor in an electric circuit, power transmitting means between the motor and one of the gears of the gearing utilized to transmit motion in one of the gear changes of the gearing including a member shiftable into and out of its active position and being normally out of its active position, means for operating the switch, and means for shifting said member, substantially as and for the purpose described.

5. The combination of a change speed transmission gearing, a starting motor, and means for connecting and disconnecting the motor and the gearing through gears of the gearing, substantially as and for the purpose set forth.

6. The combination of a change speed transmission gearing including a main casing, gears in the main casing, a starting motor, and means for connecting and disconnecting the motor and one of the gears in the main casing, substantially as and for the purpose described.

7. The combination of a change speed gearing including driving and driven shafts, a countershaft and gears mounted on the shafts, some of the gears being shiftable to connect the driving and driven shafts directly together or to connect the same together through the countershaft, an electric motor, and means for connecting and disconnecting the motor and one of said gears utilized to transmit motion in one of the gear changes of the gearing, substantially as and for the purpose specified.

8. The combination of a change speed transmission gearing, an electric motor, a switch for connecting the motor in an electric circuit, power transmitting means between the motor and the gearing including a member shiftable into and out of its active position and being normally out of its active position, means for operating the switch, means for shifting said member, and a common actuator for both of the operating means, substantially as and for the purpose specified.

9. The combination of a change speed gearing, a starting motor, and means for connecting and disconnecting the motor and the gearing comprising a swinging frame, and a gear carried by said frame and movable thereby into and out of mesh with a gear associated with the gearing, substantially as and for the purpose described.

10. The combination of a change speed gearing, a starting motor, and means for connecting and disconnecting the motor and the gearing comprising a gear shiftable into and out of mesh with a gear associated with the gearing, in a direction at substantially a right angle to the axes of the gears, substantially as and for the purpose specified.

11. The combination of a change speed gearing, a starting motor, and means for connecting and disconnecting the motor and the gearing comprising a pivoted swinging frame arranged with its axis parallel to the axis of a gear associated with the gearing, a train of gears including gears mounted respectively on the axis of said frame and connected to the motor, and on the frame eccentric to the axis thereof and movable thereby into and out of mesh with said gear associated with the gearing, and means for shifting said frame, substantially as and for the purpose set forth.

12. The combination of a change speed gearing, a starting motor, and means for connecting and disconnecting the motor and the gearing comprising a pivoted swinging frame arranged with its axis parallel to the axis of a gear associated with the gearing, a train of gears including gears mounted respectively on the axis of said frame and connected to the motor, and on the frame eccentric to the axis thereof and movable thereby into and out of mesh with said gear associated with the gearing, means for shifting said frame on its axis, a switch for connecting the motor in an electric circuit, and means for operating the switch, substantially as and for the purpose described.

13. The combination of a change speed gearing, an electric motor, and power transmitting means between the motor and the gearing comprising a train of gears including a gear shiftable into and out of active position and being normally out of active position, and means supporting said shiftable gear, arranged to be moved to shift said gear into operative position by the action of the other gears of the train on said shiftable gear, substantially as and for the purpose specified.

14. The combination of a change speed gearing, an electric motor, and power transmitting means between the motor and the gearing comprising a train of gears including a gear shiftable in an arc into and out of active position and being normally out of active position, and means supporting said shiftable gear, arranged to be moved to shift said gear into operative position by the action of the other gears of the train on said shiftable gear, substantially as and for the purpose set forth.

15. The combination of a change speed gearing, an electric motor, and power transmitting means between the motor and the gearing comprising a train of gears including a gear shiftable into and out of active position and being normally out of active position, and means supporting said shiftable gear, arranged to be moved to shift said gear into operative position by the action of the other gears of the train on said shiftable gear, said shiftable gear and its support and the gear with which it moves into mesh being arranged so that when the latter gear is being driven by the gearing independently of the motor, said shiftable gear is forced out of engagement therewith, substantially as and for the purpose specified.

16. The combination of a change speed gearing, an electric motor, power transmitting means between the motor and the gearing comprising a train of gears including a gear shiftable into and out of active position and being normally out of active position, and means supporting said shiftable gear, arranged to be moved to shift said gear into operative position by the action of the other gears of the train on said shiftable gear, said shiftable gear and its support and the gear with which it moves into mesh being arranged so that when the latter gear is being driven by the gearing, said gear of the power transmitting means is forced out of engagement therewith, a switch for connecting the motor in an electric circuit, and means for transmitting the motion of the support to the switch to open the same, substantially as and for the purpose specified.

17. The combination of a change speed gearing, a starting motor, means for connecting and disconnecting the motor and the gearing comprising a pivoted swinging frame arranged with its axis parallel to the axis of a gear associated with the gearing, a train of gears including gears mounted respectively on the axis of said frame and connected to the motor, and on the frame eccentric to the axis of said frame and movable thereby into and out of mesh with said gear associated with the gearing, a switch for connecting the motor in an electric circuit, and means for operating the switch to close the same, substantially as and for the purpose set forth.

18. The combination of a change speed gearing, a starting motor, means for connecting and disconnecting the motor and the gearing comprising a pivoted swinging frame arranged with its axis parallel to the axis of a gear associated with the gearing, a train of gears including gears mounted respectively on the axis of said frame and connected to the motor and on the frame eccentric to the axis of said frame and movable thereby into and out of mesh with said gear associated with the gearing, the frame, the shiftable gear carried thereby, and the gear with which the shiftable gear coacts, being so arranged that straight lines passing through the axes of the frame and the shiftable gear, and through the axes of the shiftable gear and the gear with which it coacts, intersect at an obtuse angle, a switch for connecting the motor in an electric circuit, and means for operating the switch to close the same, substantially as and for the purpose described.

19. The combination of a change speed gearing, a starting motor, means for connecting and disconnecting the motor and the gearing, a switch for connecting the motor in an electric circuit, operating means for the switch and the former means including a pair of parallel plungers and a crosshead connecting the plungers, substantially as and for the purpose described.

In testimony whereof, I have hereunto signed by name in the presence of two attesting witnesses, at Syracuse, in the county of Onondaga, in the State of New York, this 13th day of May, 1915.

ALEXANDER T. BROWN.

Witnesses:
S. DAVIS,
J. GLAZIER.